United States Patent Office 3,532,725
Patented Oct. 6, 1970

---

3,532,725
POLYCHLOROALKYL CYANOPERFLUORO-ALKANOATES
Edwin Dorfman, William E. Emerson, and Russell L. K. Carr, Grand Island, N.Y., assignors to Hooker Chemical Corporation, Niagara Falls, N.Y., a corporation of New York
No Drawing. Filed Aug. 17, 1967, Ser. No. 661,180
Int. Cl. C09f *11/00*
U.S. Cl. 260—404
8 Claims

ABSTRACT OF THE DISCLOSURE

Polychloroalkyl ω-cyanoperfluoroalkanoates are produced by photochlorination of alkyl ω-cyanoperfluoroalkanoates. The products are useful intermediates in the preparation of perfluoroalkylenetriazine polymers.

---

This invention relates to a new process for prepartng compositions of matter classified as polychloroalkyl ω-cyanoperfluoroalkanoates of the formulae:

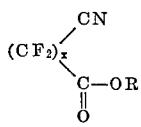

where $x$ is from 1 to 12, and R is polyhaloalkyl or polyhaloalkyl from 1 to 25 carbon atoms with at least two halogen atoms on the carbon atom adjacent to the oxygen of the oxycarbonyl group, by the photochlorination of alkyl ω-cyanoperfluoroalkanoates of the formula:

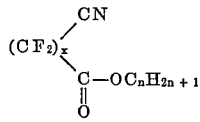

wherein $x$ is as defined above and $n$ is from 1 to 25, and recovering the product so produced. The starting material can also be of the formula:

$$NC(CF_2)_x\text{—}COCH_2Ar$$
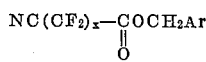

where $x$ is as defined above, and Ar is aryl of 6 to 20 carbon atoms.

It was surprising to find that the ω-cyano group is not entirely destroyed during the photochlorination process. Even so, photo decomposition of the product occurs on continued irradiation, with drastic lowering of product yield.

The invention also embraces the new compositions formed as a result of this process, which are defined by the formulae:

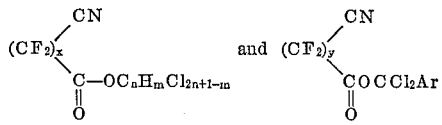

where $x=1–12$, Ar is aryl of 6–20 carbon atoms, $n=1–25$, $2n+1-m=$at least 2, and $m=0–5$.

Illustrative compounds embraced by this invention are:

trichloromethyl-ω-cyanohexafluorobutyrate, when $x=3$
dichloromethyl-ω-cyanohexafluorobutyrate, when $x=3$
trichloroethyl-ω-cyanohexafluorobutyrate, when $x=3$
tetrachloroethyl-ω-cyanohexafluorobutyrate, when $x=3$
pentachloroethyl-ω-cyanohexafluorobutyrate, when $x=3$
trichloromethyl-ω-cyanohexadecafluorononaoate, when $x=8$
dichloromethyl-ω-cyanohexadecafluorononanoate, when $x=8$
dichlorobenzyl-ω-cyanohexafluorobutyrate, when $x=3$
trichloromethyl-ω-cyanodifluoroacetate, when $x=1$
trichloromethyl-ω-cyanotetrafluoropropionate, when $x=2$
trichloromethyl-ω-cyanooctafluoropentanoate, when $x=4$
trichloromethyl-ω-cyanododecafluoroheptanoate, when $x=6$
trichloromethyl-ω-cyanoperfluorotridecanoate, when $x=12$ The alkyl cyanoperfluoroalkanoate starting materials for the process of this invention are prepared by treatment with $P_2O_5$ of the corresponding alkyl perfluoroalkylene amidates of the formulae:

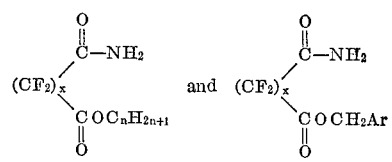

where $x$, $n$, and Ar are as defined above. This is described in copending application Ser. No. 661,241, filed Aug. 17, 1967.

The corresponding amidate is produced either by (a) treatment with ammonia of a diester of a perfluorinated dicarboxylic acid of the formula:

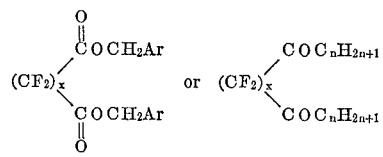

where $x$, $n$, and Ar are as defined above, or (b) by treatment of the imide of the perfluorodicarboxylic acid with a corresponding alcohol after the equations:

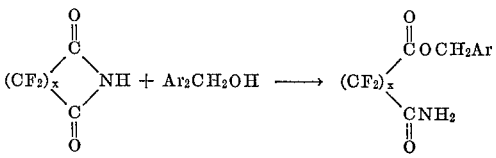

and

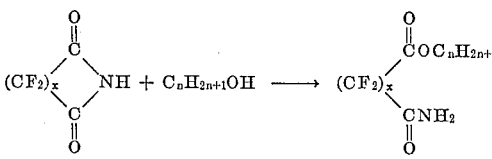

where $x$, $n$, and Ar are as defined above. This is described in copending application Ser. No. 661,240, filed Aug. 17, 1967. An example of a dialkyl perfluoroalkylene dicarboxylate is dimethyl perfluoroglutarate which was prepared by A. L. Hene and W. J. Zimmerscheid, J. Am. Chem. Soc., 67, 1235 (1945). Another example is dimethyl perfluorosebacate which was prepared by treatment of perfluorosebacoyl chloride with methanol, and recovering the diester by vacuum distillation: B.P. 120–122 at 4 mm. Perfluorosebacoyl chloride, B.P. 115–117 at 36 mm., was prepared from the acid in 86% yield using a fourfold quantity of thionyl chloride, ethyl acetate as solvent, and a catalytic amount of pyridine. Perfluorosebacic acid and perfluorotetradecanedioic acid are known compounds described by Kunyants et al., Proc. Acad. Sci. U.S.S.R., 129, 328 (1959) and I. L. Knunyants and M. N. Krasuskaya, Bull. Acad. Sci. U.S.S.R., 1963, 190. Dipropyl perfluorosebacate was prepared from perfluorosebacic acid, n-propyl alcohol and a catalytic amount of sulfuric acid. The byproduct water of reaction was removed by distillation of the propyl alcohol-water azeotropic mixture. The dipropyl perfluorosebacate had a boiling point of 125–128° centigrade at 5 millimeters of mercury pressure (absolute). Diethyl difluoromalonate or dimethyl difluoromalonate may be produced by the method of C. E. Inman, R. E. Oesterling, and E. A. Tyczkowski, J. Am. Chem. Soc., 80, 6533–5 (1958). Perfluoropimelic acid, perfluoroazelaic acid and perfluorononanedioic acid may be made by electrolytic fluorination of the corresponding hydrocarbon acids by the method of Guenther, U.S. Pat. No. 2,606,206, which gave perfluorosebacic acid. The esters of these acids can be made by the procedures used for the preparation of the perfluorosebacic acid esters described above. Examples of imides are perfluorosuccinimide and perfluoroglutarimide, which were prepared by the method of A. L. Hene and W. F. Zimmer, J. Am. Chem. Soc., 73, 1103 (1951). Other homologous perfluoroalkanedioic acid imides may be prepared by this process when the corresponding perfluoroalkanedioic acid amides are used as starting materials.

Among the ester groups which can be attached to the omega-cyanoperfluoro compound are methyl, ethyl, propyl, isopropyl, butyl, isobutyl, pentyl, hexyl, nonyl, decyl, dodecyl, benzyl and the like.

Thus when $x$ is 3 and $n$ is 2, the starting componnd to be photochlorinated is ethyl 4-cyanohexafluorobutyrate.

The photochlorination is carried out in a temperature range between about 30 and about 120 degrees centigrade. A preferred range is between about 50 and about 70 degrees centigrade.

The molar ratio of chlorine to reactant should be sufficient to replace at least two hydrogens with chlorine, when a hydrocarbon ester radical of the formula:

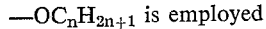
$-OC_nH_{2n+1}$ is employed

Thus, the minimum molar ratio of chlorine to reactant for this type of ester is about 2:1. The maximum molar ratio of chlorine to reactant depends upon the amount of additional hydrogen substitution which may be desired.

When the radical on the ω-cyanoperfluoroalkanoate compound is Ar, then the minimum mole ratio of chlorine to reactant is about 2:1. The maximum molar ratio of chlorine to reactant depends upon the amount of additional hydrogen substitution which may be desired.

In a typical method, the chlorine is introduced as rapidly as it is consumed in the reaction mixture while under the influence of acetinic radiation. Since the chlorination reaction is exothermic, cooling should be provided.

Atmospheric pressure may normally be used in effecting the process of this invention. However, pressures higher than or lower than atmospheric pressure may also be used. In order to remove the evolving hydrogen chloride gas it may be desirable to operate at slightly reduced pressures. It is preferred to remove the hydrogen chloride before operating under conditions which would cause the evaporation of the starting material or the product from the reaction mixture. However, under certain circumstances, it may be desirable to operate under such conditions that the product is evolved along with the hydrogen chloride and taken off overhead.

We prefer to operate the process in the absence of a solvent; however, use of an inert solvent such as carbon tetrachloride or hexachlorobutadiene may be used if it is desired.

A mercury vapor lamp supplied the actinic radiation for the photochlorination process. However, other actinic radiation means may be used. The amount of radiation theoretically required is ordinarily minimal since the photochlorination mechanism is a chain reaction. As a practical matter, however, the presence of reaction inhibitors in the starting materials or formed during the reaction, necessitate larger amounts of actinic light than might be theoretically required from a consideration of the type of reaction.

The polychloroalkyl cyanoperfluoroalkanoates produced by this invention may be used in the impure conditions in which they are formed, or they may be isolated by distillation.

The polychloroalkyl cyanoperfluoroalkanoates produced by the process of this invention are important intermediates in the production of ω-cyanoperfluoroalkanoyl chlorides which are useful intermediates in the preparation of perfluoroalkylenetriazine polymers, such as those disclosed in copending application S.N. 533,430, filed Mar. 11, 1966. These polymers are thermally stable and resistant to some solvents, while being soluble in other solvents, such as alkyl acetate, alkyl perfluoroalkanoates, and fluorinated solvents such as fluorinated xylenes and fluorine-containing triazines.

This invention is further illustrated in the examples below, wherein temperatures are in degrees centigrade and parts are by weight.

EXAMPLE 1

Trichloromethyl ω-cyanohexadecafluorononanoate

Methyl ω-cyanoperfluorononanoate, 33.9 grams, was photochlorinated using chlorine gas and a mercury vapor bulb at 50–70 degrees centigrade until infrared spectra showed no absorption for carbon-hydrocarbon stretch vibration, which indicated that the reaction was completed. Distillation at 8 mm. mercury pressure gave a product which boiled at 100° centigrade. Chlorine analysis: calculated for $C_{11}Cl_3F_{16}NO_2$: Cl, 18.07%. Found: 18.06%.

In a similar manner, by substituting methyl ω-cyanododecafluoroheptanoate (26.9 grams) for the methyl ω-cyanohexadecafluorononanoate used in the above reaction, trichloromethyl ω-cyanododecafluoroheptanoate can be obtained.

In a similar maner, by substituting methyl ω-cyanooctafluoropentanoate (19.9 grams) for the methyl ω-cyanohexadecafluorononanoate used in the above reaction, trichloromethyl ω-cyanooctafluoropentanoate can be obtained.

EXAMPLE 2

Trichloromethyl ω-cyanohexafluorobutyrate

Methyl 4-cyanoperfluorobutyrate, 39.0 grams, was treated with chlorine gas in a 3-necked round bottomed flask with a stirring at 50–70° centigrade. Distillation at 26–34° centigrade and 0.10 mm. mercury, gave 20.5 grams of distillate.

Analysis.—Calculated for $C_6Cl_3F_6NO_2$ (percent): C, 20.68; Cl, 30.53; N, 4.02. Found (percent): C, 21.47; Cl, 31.28; N, 4.28.

In a similar manner, by substituting methyl ω-cyanotetrafluoropropionate (30.7 grams) for the methyl ω-cyanoperfluorobutyrate used in the above reaction, trichloromethyl ω-cyanotetrafluoropropionate can be obtained.

In a similar manner, by substituting methyl ω-cyanodifluoroacetate (22.4 grams) for the methyl ω-cyanoperfluorobutyrate used in the above reaction, trichloromethyl ω-cyanodifluoroacetate can be obtained.

EXAMPLE 3

Dichloromethyl ω-cyanohexafluorobutyrate

Methyl 4-cyanohexafluorobutyrate was treated with chlorine as in the above example, except that the reaction was allowed to give a dichloromethyl derivative, boiling point, 70° centigrade, at 50 mm. pressure; purity, 90% by g.l.c. analysis. Analysis: calculated for $C_6Cl_2HF_6NO_2$: Cl, 23.5%. Found: Cl, 22.9%. Heating of the dichloromethyl ester, 7 g., with ferric chloride, 0.25 gram, at 170° gave distillate, 3.7 grams, which by g.l.c. analysis contained 75% of 4-cyanohexafluorobutyryl chloride.

In a similar manner, by substituting benzyl ω-cyanoperfluorobutyrate for the methyl ω-cyanoperfluorobutyrate used in the above reaction, dichlorobenzyl ω-cyanoperfluorobutyrate can be obtained.

EXAMPLE 4

Polychloroethyl ω-cyanohexafluorobutyrate

Similarly prepared by chlorination of ethyl 4-cyanohexafluorobutyrate was obtained a mixture of trichloroethyl, pentachloroethyl, and tetrachloroethyl 4-cyanohexafluorobutyrates. This mixture, 40 parts, and ferric chloride, 5 parts, were combined in a distillation apparatus and heated in an oil bath at 150 and 180 degrees centigrade. The distillate was 14 parts and contained 45% of 4-cyanohexafluorobutyryl chloride.

PREPARATION OF ALKYL Ω-CYANOPERFLUOROALKANOATE STARTING MATERIALS

In accordance with S.N. 661,241, filed Aug. 17, 1967, the starting materials for this invention are prepared in the following illustrative manner.

EXAMPLE 5

Methyl ω-cyanohexadecafluorononanoate

A mixture of methyl perfluorosebacamidate (61 grams) and phosphorus pentoxide (185 grams) was heated in a bath maintained at about 200 degrees centigrade. After 15 minutes the pressure was reduced to 35 millimeters mercury to permit distillation of the product. Distillate (50.5 grams) boiling at 111–113 degrees centigrade was collected during the next two hours. The distillate was redistilled at 35 millimeters to give a fraction (39 grams) boiling at 112 to 115 degrees centigrade.

*Analysis.*—Calculated for $C_{11}H_3F_{16}NO_2$ (percent): C, 27.23; H, 0.62; N, 2.89. Found (percent): C, 27.14; H, 0.87; N, 2.91.

In a similar manner, by substituting methyl perfluorosugeramidate (48.8 grams) for the methyl perfluorosebacamidate used in the above reaction methyl ω-cyanododecafluoroheptanoate can be obtained.

In a similar manner, by substituting methyl perfluoroadipamidate (36.7 grams) for the methyl perfluorosebacamidate used in the above reaction, methyl ω-cyanooctafluoropentanoate can be obtained.

In a similar manner, by substituting n-propyl perfluorosebacacidate (64.4 grams) for the methyl perfluorosebacamidate used in the above reaction, n-propyl ω-cyanohexadecafluorononanoate can be obtained.

EXAMPLE 6

Methyl ω-cyanoperfluorobutyrate

Methyl perfluoroglutaramidate (37 grams) was combined with phosphorus pentoxide (40 grams) under nitrogen in a 500-milliliter flask. This was connected to a nitrogen-blanketed distillation head, condenser, and receiver and immersed in a bath maintained at about 200 degrees centigrade. After 10 minutes, distillate started to collect in the receiver and continued for about 2 hours. The crude product was redistilled in a 95 percent yield. It had a boiling point of 116 degrees centigrade at 755 millimeters mercury.

*Analysis.*—Calculated for $C_6H_3F_6NO_2$ (percent): C, 30.66; H, 1.29; N, 5.96. Found (percent): C, 30.90; H, 1.39; N, 6.11.

In a similar manner, by substituting methyl perfluorosuccinamidate (29.7 grams) for the methyl perfluoroglutaramidate used in the above reaction, methyl ω-cyanotetrafluoropropionate can be obtained.

In a similar manner, by substituting methyl difluoromalonamidate (22.3 grams) for the methyl perfluoroglutaramidate used in the above reaction, methyl ω-cyanodifluoroacetate can be obtained.

PREPARATION OF PERFLUOROALKYLENEAMIDATE STARTING MATERIALS FROM DIESTER

In accordance with S.N. 661,241, filed Aug. 17, 1967, the derivative starting materials are prepared from the diester in the following illustrative manner.

EXAMPLE 7

Benzyl perfluoroglutaramidate

In a manner after Example 1 benzyl perfluoroglutaramidate was prepared from perfluoroglutaramide and benzyl alcohol. The product had a melting point of between 61 and 62 degrees centigrade (from toluene).

*Analysis.*—Calculated for $C_{12}H_9F_6NO_3$ (percent): C, 43.78; H, 2.76; N, 4.26. Found (percent): C, 43.62; H, 2.57; N, 4.28.

PREPARATION OF PERFLUOROALKYLENEAMIDATE STARTING MATERIALS FROM THE IMIDE

In accordance with S.N. 661,241, filed Aug. 17, 1967, the derivative starting materials are prepared from the imide in the following illustrative manner.

EXAMPLE 8

Methyl perfluoroglutaramidate

Perfluoroglutarimide (5 grams, 0.023 mole) and methanol (0.79 grams, 0.0246 mole), were sealed in a tube and heated to about 100 degrees centigrade. In 50 minutes the reaction was almost complete as indicated by infrared analysis. Heating was continued for about 90 minutes more to complete the reaction. A solid product was recrystallized from toluene and dried. It had a melting point of 45.0–45.5 degrees centigrade.

*Analysis* (percent): Calculated for $C_6H_5F_6NO_3$ (percent): C, 28.47; H, 1.99; N, 5.53. Found (percent): C, 28.40; H, 1.99; N, 5.62.

In a similar manner, by substituting perfluorosuccinimide (3.93 grams, 0.023 mole) for the perfluorosuccinimide used in the above reaction, methyl perfluorosuccinamidate can be obtained.

Although this invention has been ilustrated by citing specific details of given species embraced within the scope of this invention, it is to be understood that various modifications within the invention are possible, some of which have been referred to above. For instance, polychloroalkyl ω-cyanoperfluoroetheralkanoates and polychloroaralkyl ω-cyanoperfluoroetheralkanoates may be made. These compounds have the formulae:

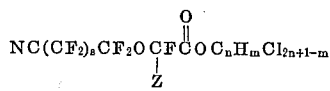

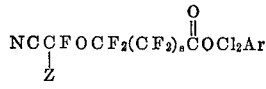

where s is an integer of from 0 to 12, n is an integer of from 1 to 25, m is 0 to 5, $2n+1-m$ is at least 2, and Ar is aryl of 6 to 20 carbon atoms,

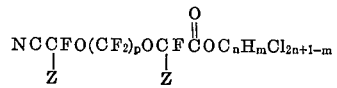

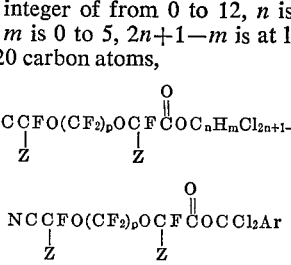

where p is an integer of from 2 to 12, and n, m, Ar, and $2n+1-m$ are as defined above,

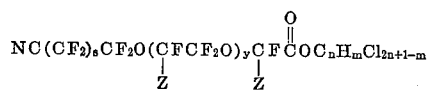

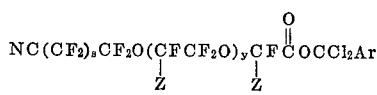

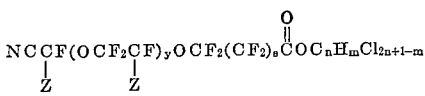

and

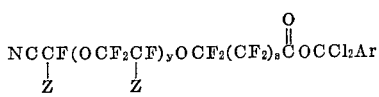

where $y$ is an integer of from 0 to 100, and $s$, $n$, $m$, Ar, and $2n+1-m$ are as defined above,

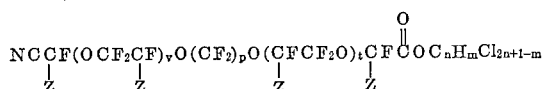

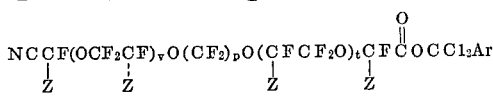

where $v$ plus $t$ is an integer of from 0 to 100, and $p$, $n$, $m$, Ar, and $2n+1-m$ are as defined above,

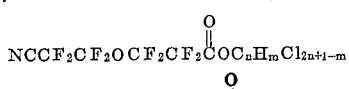

where $n$, $m$, Ar, and $2n+1-m$ are as defined above, $$NC(CF_2)_x\overset{O}{\underset{\|}{C}}OCCl_2(CF_2)_nQ$$

where $x$ is from 1 to 12, $n$ is from 1 to 20 and Q is selected from the group consisting of fluorine and chlorine.

In each of the above formulae Z is selected from the group consisting of fluorine and $CF_3$.

Illustrative compounds embraced by this process are:

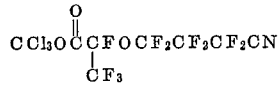

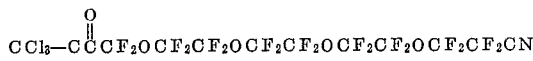

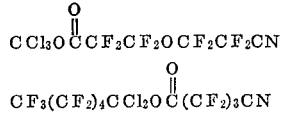

Other compounds embraced by this process are polychloroalkyl ω-cyanoperfluoroalkanoates of branched perfluoroalkandioic acids such as the following ilustrative examples

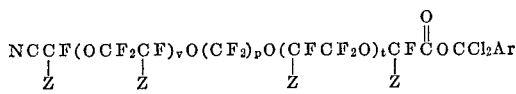

and

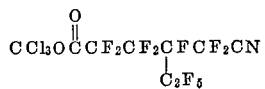

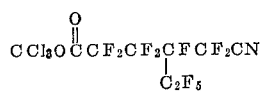

Other statrting materials embraced by this invention are haloalkyl ω-cyanoperfluoroalkanoates of the formula:

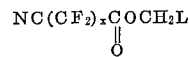

where $x$ is as defined above, and L is haloalkyl of 1 to 24 carbon atoms where the halogen(s) is selected from chlorine and fluorine, with the balance of the haloalkyl group being hydrogen. An example of this type of partially halogenated alcohol ester would be difluoroethl ω-cyanohexafluorobutyrate, and the product of photochlorination would be dichlorodifluoroethyl ω-cyanohexafluorobutyrate.

What is claimed is:

1. Polychloro alkyl omega-cyano perfluoroalyanoates selected from the group consisting of

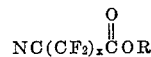

wherein $x$ is from 1 to 12; and R is polychloro lower alkyl or polychloro benzyl with at least 2 chlorine atoms on the carbon atom adjacent to the oxycarbonyl oxygen of the oxycarbonyl group.

2. A compound of claim 1 wherein R is polychloro lower alkyl.

3. A compound of claim 1 wherein R is

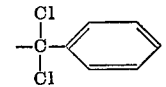

4. The compound of claim 1 wherein $x$ is 3 and R is trichloromethyl, namely, trichloromethyl W-cyanohexafluorobutyrate.

5. The compound of claim 1 wherein $x$ is 3 and R is dichloromethyl, namely, dichloromethyl ω-cyanohexafluorobutyrate.

6. The compound of claim 1 wherein $x$ is 3 and R is tetrachloroethyl, namely: tetrachloroethyl ω-cyanohexafluorobutyrate.

7. The compound of claim 1 wherein $x$ is 6 and R is trichloromethyl, namely, trichloromethyl ω-cyanododecafluoroheptanoate.

8. The compound of claim 1 wherein $x$ is 8 and R is trichlormethyl, namely, trichloromethyl omega-cyano hexadecafluorononanoate.

References Cited

UNITED STATES PATENTS

| | | | |
|---|---|---|---|
| 3,083,241 | 2/1966 | De Benneville et al. | 260—465.4 |
| 3,235,581 | 2/1966 | De Benneville et al. | 260—465.4 |
| 3,248,419 | 4/1966 | Hauptschein et al | 260—465.4 |
| 3,274,229 | 9/1966 | Verbanic | 260—465.2 |
| 3,349,105 | 10/1967 | Verbanic | 260—465.2 |

Wagner et al.: Synthetic Organic Chemistry, pp. 98–99 (1964).

Morison et al.: Organic Chemistry, pp. 264–265 (1962).

LEWIS GOTTS, Primary Examiner

G. HOLLRAH, Assistant Examiner

U.S. Cl. X.R.

204—158; 260—18.4, 465, 465.4, 482